Jan. 23, 1968 W. E. MYERS 3,365,062
EXTRACTOR COVER CONSTRUCTION AND LOCKING MECHANISM
Filed July 20, 1965 4 Sheets-Sheet 1

INVENTOR
WAYNE E. MYERS

BY George H. Fritzinger
AGENT

Jan. 23, 1968  W. E. MYERS  3,365,062
EXTRACTOR COVER CONSTRUCTION AND LOCKING MECHANISM
Filed July 20, 1965  4 Sheets-Sheet 2

INVENTOR
WAYNE E. MYERS

BY George H. Fritzinger
AGENT

INVENTOR
WAYNE E. MYERS

BY George H. Fritzinger
AGENT

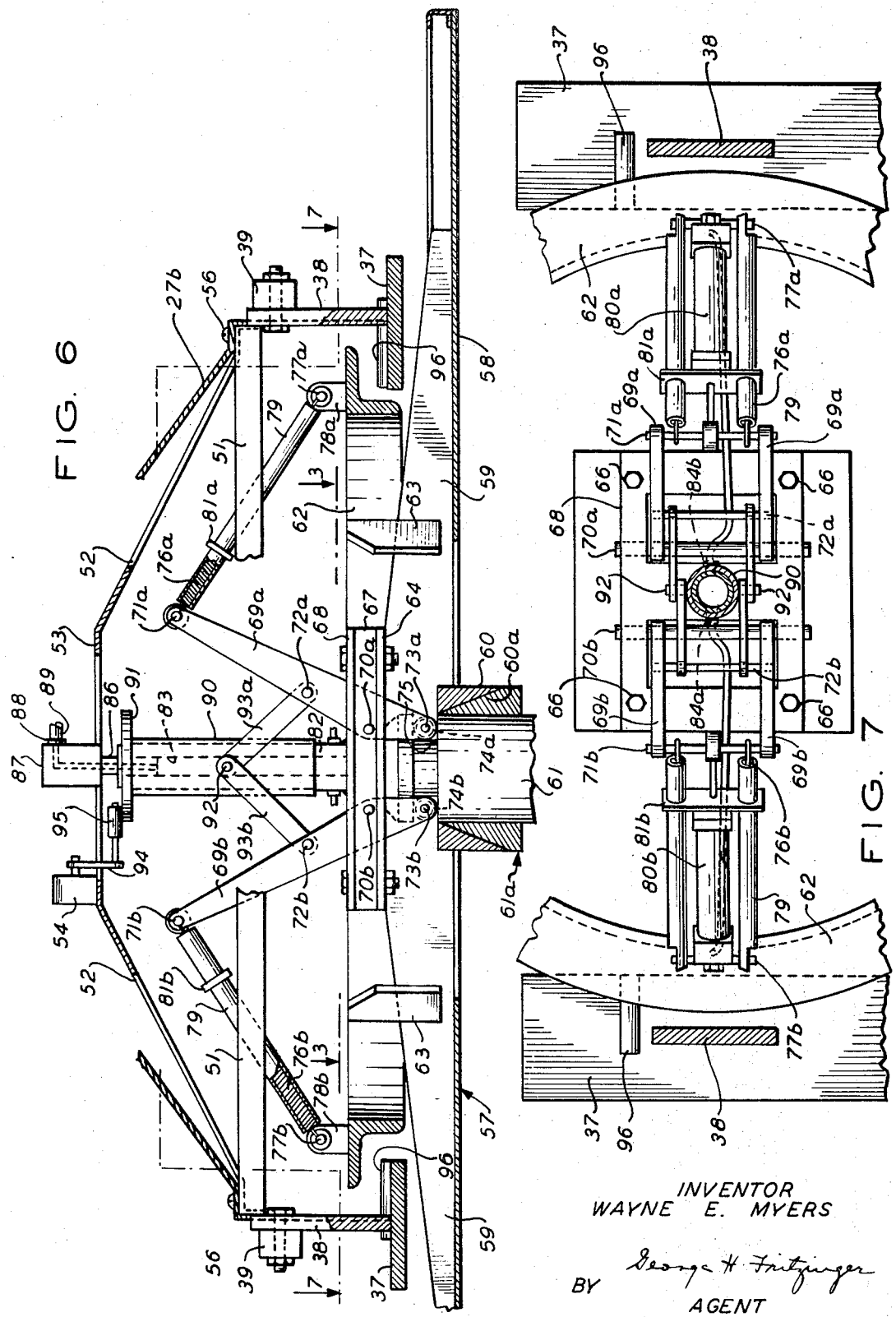

United States Patent Office 3,365,062
Patented Jan. 23, 1968

3,365,062
EXTRACTOR COVER CONSTRUCTION AND
LOCKING MECHANISM
Wayne E. Myers, Rochester, N.Y., assignor to McGraw-Edison Company, Elgin, Ill., a corporation of Delaware
Filed July 20, 1965, Ser. No. 473,368
9 Claims. (Cl. 210—143)

ABSTRACT OF THE DISCLOSURE

The invention relates to a vertical type extractor for removing moisture from clothes by centrifugal action. The extractor comprises an outer upright cylindrical casing supporting therein a rotary perforated basket for rotation about a central axis. A cover structure comprises an inner lid for the basket and an outer cover for the casing. The lid is loosely attached to the outer cover so that the lid and cover are opened and closed together. A locking mechanism is provided to secure the lid to the basket in a position out of contact with the cover when the cover is closed. The lid is seated in the basket by gravitational force. The locking mechanism is spring-urged into closed position and is further urged into closed position by centrifugal force as the basket is rotated. A safety switch between the cover and locking mechanism prevents the basket from being driven except when the lid is properly seated and locked.

---

It is an object of the invention to provide a simple, effective and economical cover construction for vertical-type centrifugal extractors permitting both covers to be opened and closed together by a single power-operated means.

Another object is to provide a power-controlled means for locking the inner cover to the basket out of contact with the outer cover when the outer cover is closed.

Other objects and features reside in the details of construction and novel combinations of parts by which an economical and durable cover construction is provided for centrifugal extractors, and will be apparent from the following description and the appended claims.

In the description of the invention reference is had to the accompanying drawings, of which:

FIGURE 6 is a view similar to FIGURE 5 but showing the locking mechanism in locked position; and FIGURE 7 is a fractional sectional plan view taken on the line 7—7 of FIGURE 6.

Figure 1:
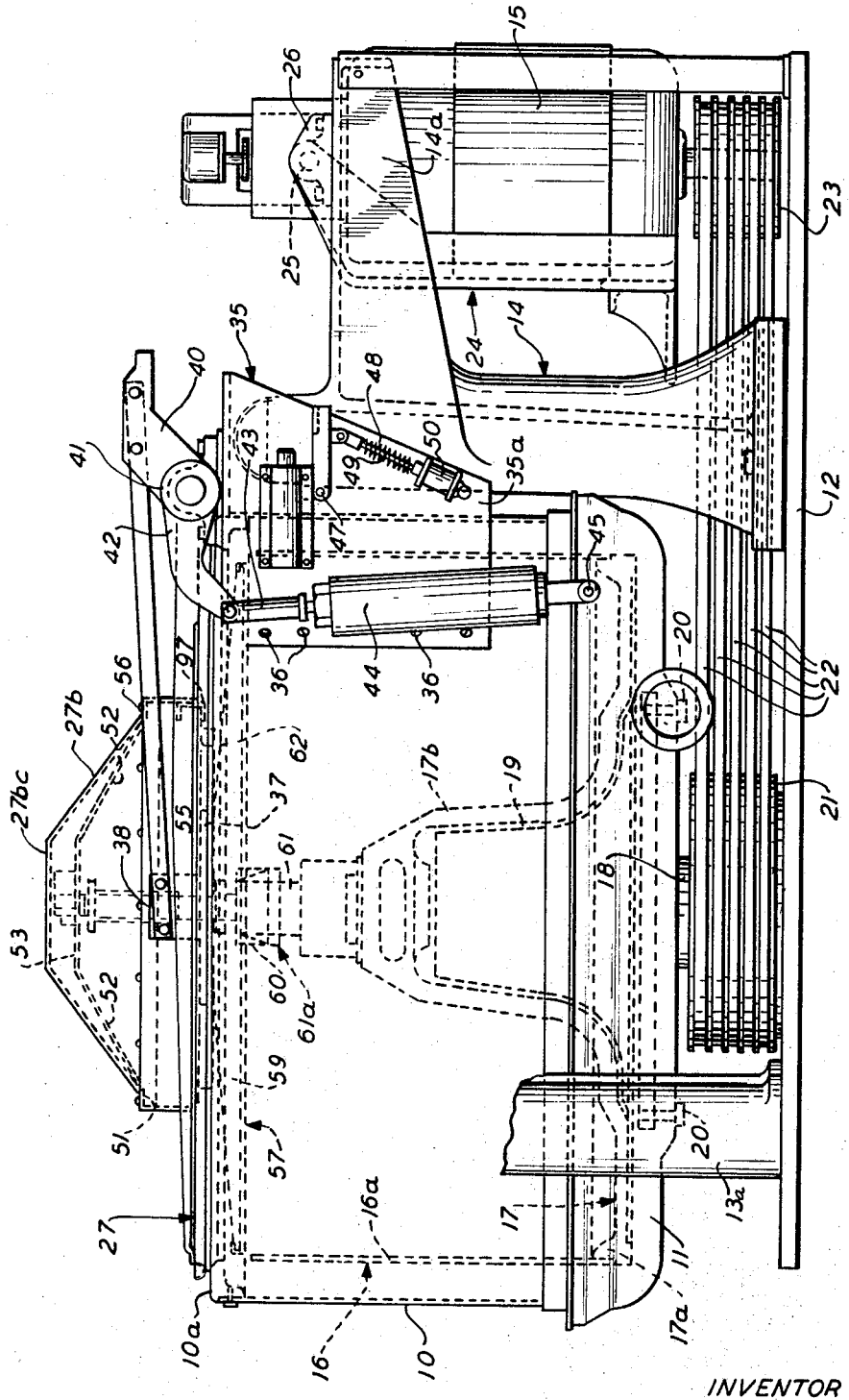
FIGURE 1 is a side elevational view of a centrifugal extractor embodying my invention showing the extractor closed.
Figure 2:
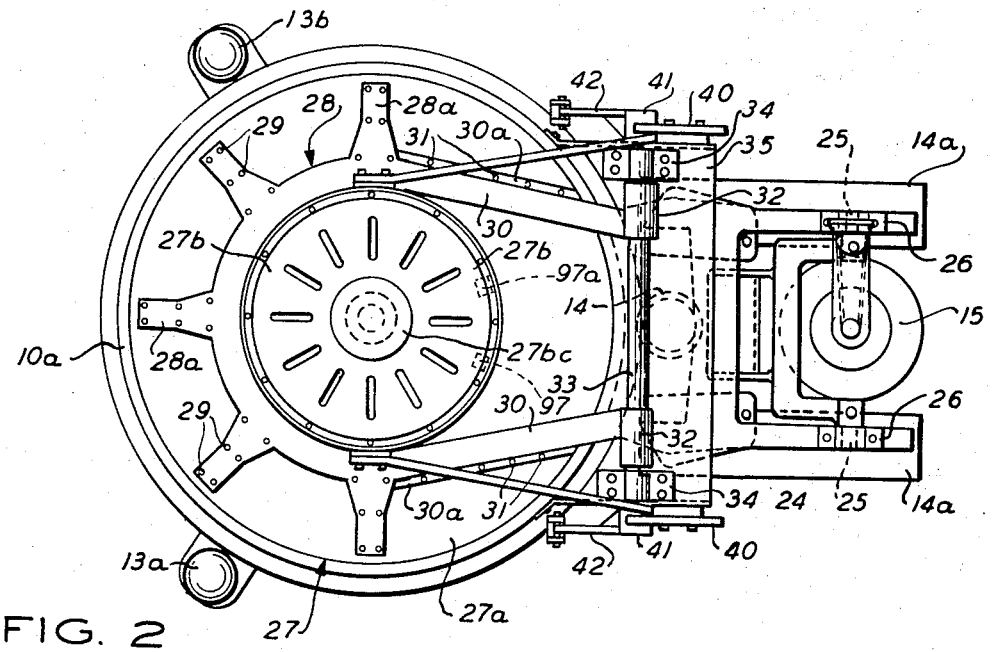
FIGURE 2 is a top plan view of this extractor but to a smaller scale.

The present centrifugal extractor comprises an outer upright cylindrical casing 10 having an annular sidewall provided at the top with a rim flange 10a and joined at the bottom to a heavy cast iron base structure 11. The casing is supported above a base plate 12 on three pedestals at 120° intervals two of which are single pedestals 13a and 13b located at the front of the casing and the third of which is a broad bifurcated pedestal 14 at the back of the casing provided with two spaced rearwardly extending arms 14a for supporting therebetween a drive motor 15 (FIGURES 1 and 2). Within the casing 10 is a cylindrical basket 16 also open to the top and spaced from the wall of the casing. The basket comprises an annular perforated wall 16a which seats on and is welded to a rim flange 17a of a circular bottom plate 17. The bottom plate has a central substantially cone-shaped central portion 17b which forms a hub for the basket. The hub is secured internally to a shaft 18 which extends downwardly through a heavy bearing 19 bolted at 20 to the base structure 11 of the casing 10. Secured to the lower end of the shaft 18 between the casing 10 and base plate 12 is a multi-groove pulley 21 around which is trained a plurality of V belts 22 leading from a similar multi-groove pulley 23 on the shaft of the drive motor 15. The motor 15 is suspended pivotally from the pedestal arms 14a by being secured rigidly to a cross bar 24 having two oppositely extending trunnions 25 which pivot in bearings 26 mounted on the top sides of the arms 14a. This mounting permits the motor to be rocked inwardly at the bottom to permit easy installation of the belts 22 as well as adjustment of the motor to set the tensioning of the belts.

Figure 3:
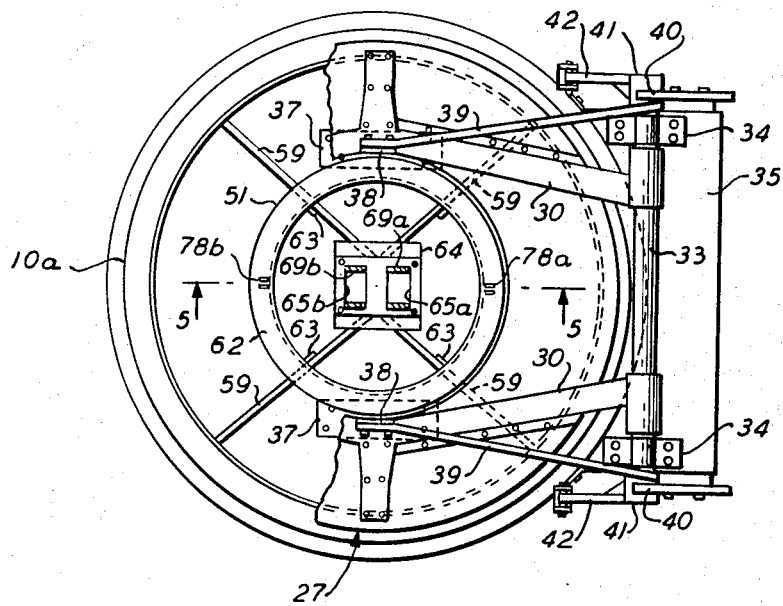
FIGURE 3 is a fractional top plan view of this extractor showing portions of the outer cover broken away and parts in section on the line 3—3 of FIGURE 6.
Figure 4:
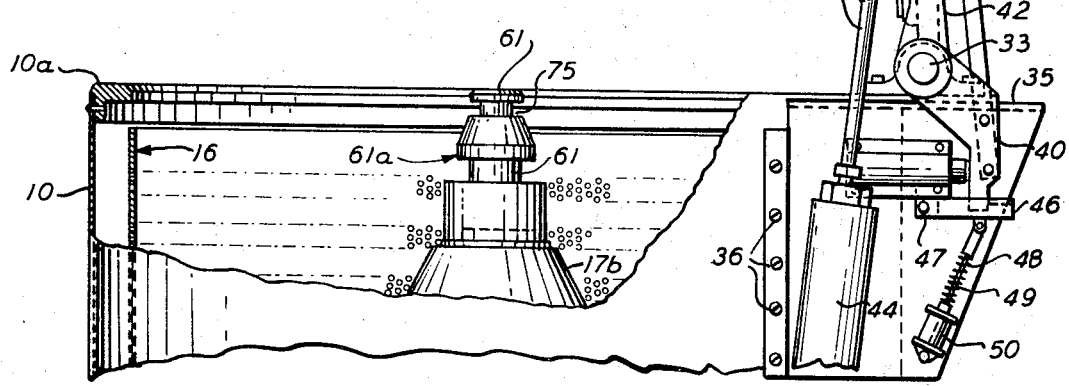
FIGURE 4 is a fractional side elevational view with portions broken away showing the cover structure in a raised open position.

The casing 10 is provided with a circular cover 27 comprising an outer annular section 27a and a central dome 27b. Mounted on the front half of the cover section 27a is a frame in the form of a semi-circular spider 28 having radial arms 28a riveted at 29 to the annular cover section 27a. Extending rearwardly from the spider 28 are two converging arms 30 having side flanges 30a riveted at 31 also to the annular cover section 27a. The arms 30 terminate in hubs 32 which are traversed by and secured to a cross shaft 33. This shaft is mounted in two spaced bearings 34 at the outer sides of the hubs 32. The bearings are bolted onto the top side of a bracket 35. The top side or platform of this bracket conforms to the circular wall of the casing 10 and has depending sidewalls 35a with flanges conforming to the casing and bolted thereto at 36. Riveted to the spider 28 against the underside of the cover 27 in diametrically opposite positions are two heavy rectangular bracket plates 37. The inner portions of these plates extend inwardly past the inner circular edge of the annular section 27a of the cover as shown in FIGURE 3, which is for the purpose of lifting the inner cover or lid as will appear. Welded to these bracket plates are upright standards 38. Bolted to the upper ends of the standards 38 are reinforcing bars 39 which extend rearwardly in diverging relation to the respective arms 30 as shown in FIGURE 3. The rear end portions of the reinforcing bars are bolted to lever arms 40 welded to and extending rearwardly from respective hubs 41 pinned to the ends of the shaft 33 beyond the bearings 34. The hubs 41 have also forwardly extending lever arms 42 welded thereto which are pivotally connected to piston rods 43 extending upwardly from respective air cylinders 44. The lower ends of these air cylinders are pivotally connected at 45 to the base structure 11 of the casing 10. When the air cylinders are actuated by air pressure from the bottom (by means not herein necessary to show) the pistons are driven upwardly to swing the cover 27 into an upright position shown in FIGURE 4. As the cover reaches an upright position the end portions of the lever arms 40 are moved into locking engagement with respective latch members 46. These latch members are pivoted at 47 to the end walls of the bracket 35 and are pressed upwardly into latching positions by compression springs 48 on piston rods 49 of respective air cylinders 50 also hinged to the end walls of the bracket 35. When air pressure is fed into the air cylinders 50 at the top the pistons are drawn inwardly to unlatch the cover. At the same time a controlled release of air pressure from the air cylinders 44 allows the cover 27 to be lowered into a closed position at a controlled rate of speed.

Bolted to the inner wall of the top portions of the two upright standards 38 is a circular angle iron 51 which forms a frame for the dome section 27b of the outer cover. Welded to the angle iron 51 are spokes 52 which are inclined upwardly towards the center of the extractor (FIGURE 6) and welded to the inner ends of these spokes is an annular plate 53. This annular plate supports a safety switch 54 herein later described. The circular sidewall of the dome 27b has rectangular cutouts 55 to clear the two side standards 38 (FIGURE 1). The central conical portion of the dome 27b is inclined upwardly more sharply than are the spokes 52 and is truncated by a circular cap 27c at a height sufficient to clear the safety switch 54. The lower border portion of the coned portion of the dome 27b is flanged outwardly and secured flat against the top of the circular angle iron 51 by screws 56.

The basket 16 has an inner cover or lid 57. This lid comprises a flat annular plate 58 which fits snugly within the basket. This lid is reinforced on its upper side by four spokes 59 welded thereto. These spokes are welded together in pairs at their inner ends (FIGURE 3) and the two pairs are in turn welded to opposite sides of a hollow centering cone 60 which has a conically tapered inside wall 60a. This centering cone telescopes onto cone-shaped member 61a secured to a center post 61 upstanding from the hub 17b of the basket 16 to center the lid in the basket as the outer cover is closed. Above the lid in concentric relation thereto is a circular angle iron 62 secured to the spokes 59 through tie bars 63 as by welding. The rim of this angle iron overlies the inner portions of the bracket plates 38 to provide a loose coupling of the lid to the outer cover.

Figure 5:
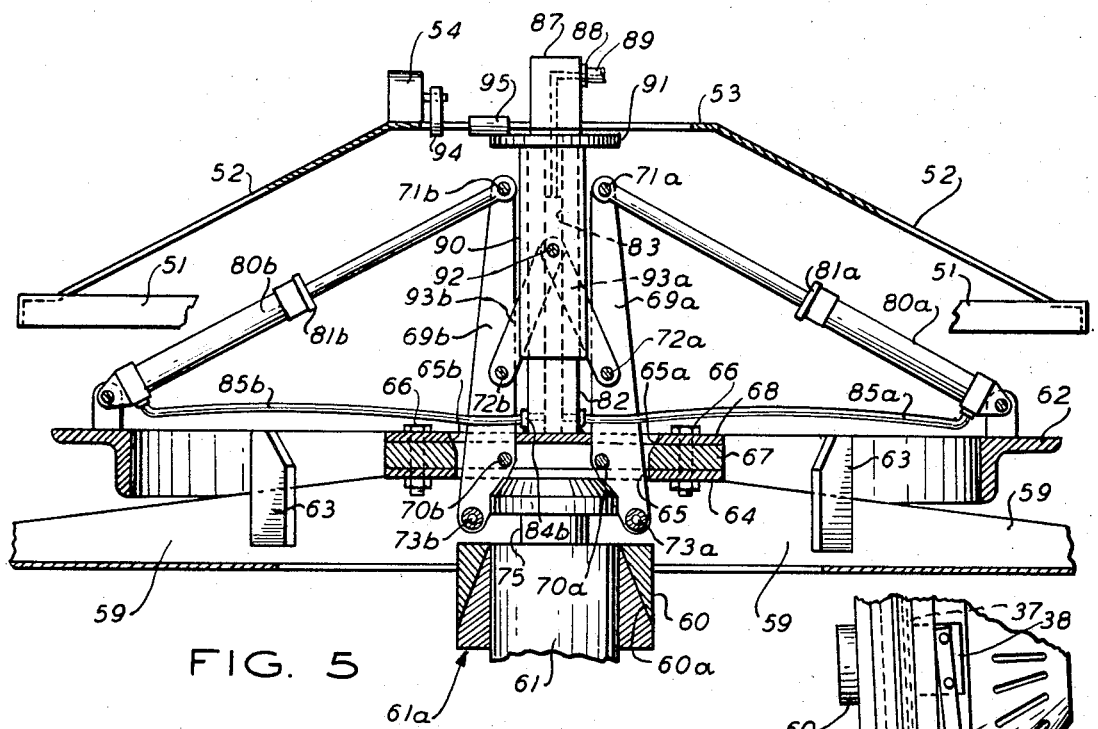
FIGURE 5 is a fractional view of the central portion of the cover structure with parts in section on the line 5—5 of FIGURE 3 showing the locking mechanism in unlocked position.

The spokes 59 on the lid 57 are of increasing height proceeding toward the center of the lid and are welded at their inner ends to the underside of a rectangular frame plate 64 having two diametrically opposite rectangular cutouts 65a and 65b as shown in FIGURE 5. Secured by bolts 66 to the top side of the frame plate 64 are a spacer block 67 and a top clamping plate 68. The spacing block 67 and clamping plate 68 are narrower than the frame plate 64 but have the same cutouts. Extending through the cutouts 65a and 65b are respective pairs of identical locking levers 69a and 69b. The pairs of locking levers 69a and 69b have respective shafts 70a and 70b which pivot in bearings in the spacer block 67. The respective pairs of locking levers 69a and 69b are also bridged by shafts 71a and 71b at their upper ends, by shafts 72a and 72b at their intermediate portions, and by shafts 73a and 73b at their lower ends. Journaled on the central portions of the shafts 73a and 73b are respective cylindrical rollers 74a and 74b which are moved into engagement with a peripheral groove 75 in the center post 61 above the cone-shaped member 61a (FIGURE 6) to lock the lid to the basket 16 upon the locking levers 69a and 69b being swung outwardly from the top while the lid is resting in a closed position on the center post 61. When the lid is in such closed position the rim of the angle iron 62 is spaced substantially above the bracket plates 37 to free the lid for rotation relative to the outer cover 27 as is shown in FIGURE 6.

The locking levers 69a and 69b are urged outwardly into locking positions by respective pairs of tension springs 76a and 76b. The springs 76a are connected from the opposite ends of the shaft 71a to a cross shaft 77a in a bracket 78a welded to the circular angle iron 62, and the springs 76b are similarly connected from the opposite ends of the shaft 71b to a cross shaft 77b in a bracket 78b welded to the angle iron 62 at a point diametrically opposite the bracket 78a. All of the tension springs are encased in respective tubes 79 of a length equal to the distance between the shafts 71 and 77 when the locking levers are in locking positions.

Operatively interconnected between the shaft 71a and shaft 77a midway between the respective springs 76a is an air cylinder 80a, and operatively interconnected between the shaft 71b and shaft 77b midway between the respective spring 76b is an air cylinder 80b (FIGURES 5 and 7). These air cylinders have respective guide plates 81a and 81b secured to their upper end portions. The guide plates have central apertures through which slidably pass the respective piston rods of the air cylinders and have apertured end portions traversed by the respective tubes 79 to secure the tubes and the air cylinders into a unitary structure. The air cylinders are actuated by air pressure from the bottom to shift the locking bars 69a and 69b inwardly at the top whereby to unlock the lids 57 from the center post 61 of the basket 16.

At the axis of the lid 57 there is a post 82 which traverses a center hole in the plate structure 64–67–68 and is secured by welding to the upper plate 68 (FIGURE 6). This post extends upwardly from the plate 68 nearly to the level of the annular frame plate 53 on the outer groove 27. The frame plate 64 forms a seating surface for the lid on the center post 61 to define the closed position of the lid. The post 82 has a central opening 83 running from near the bottom through the top end thereof. This opening is an air duct connected via side nipples 84a and 84b at the bottom of the post and thence via tubes 85a and 85b to the respective air cylinders 80a and 80b. (FIGURE 5). A tube 86 is fitted rotatably into the opening 83 at the upper end of the post 82 in a manner forming an air tight swivel coupling with the air duct 83. This tube has a head 87 provided with a side nipple 88. The side nipple is connected via tubing 89 on the outer cover 27 to a source of air pressure (not shown) for operating the locking cylinders 80.

Slidably mounted on the post 82 is a sleeve 90 provided with a circular flange 91 at the top. This sleeve has side trunnions 92 midway its length which are coupled by link members 93a and 93b to the intermediate cross shafts 72a and 72b of the locking levers 69a and 69b. By this coupling the sleeve is moved downwardly as the lid 57 is locked (FIGURE 6) and is moved upwardly as the lid is unlocked (FIGURE 5). The safety switch 54 has a crank-type operating lever 94 provided with a roller 95 above the flange 91. In the downward position of the sleeve 90 the switch 54 is closed to permit the drive motor 15 to be operated. However, if the lid 57 is not seated in a closed position permitting the locking rollers 74a and 74b to engage the groove 75 responsive to the springs 76a and 76b as air is released from the air cylinders 80, the sleeve 90 will be retained in an upper position to hold the safety switch 54 open and to prevent the drive motor 15 from being started.

In order to prevent canting of the lid 57 as it is raised from closed position by the opening of the outer cover 27, the lifting bracket plates 37 are provided with ridges 96 to engage the circular angle iron 62 of the lid on a line offset rearwardly from the axis of the machine (FIGURES 6 and 7). Also, in order to support the lid 57 vertically when the cover 27 is in an upright position shown in FIGURE 4, U-shaped brackets 97 and 97a are bolted to the frame of the cover 27 in the dome section 27b at the rearward side of the machine. These brackets embrace the rim of the circular angle iron 62 on the lid structure but stand free of this angle iron when the outer cover is closed as it indicated in FIGURE 1.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. In an extractor including a cylindrical casing open to the top and having an upright drive shaft at the center carrying a perforated basket for rotation to extract moisture from clothing in the basket by centrifugal force: the combination of a hinged outer cover, an inner lid loosely attached to the inner side of said outer cover to be carried between open and closed positions as the outer cover is opened and closed, a center post in said basket, centering means on said lid engageable with said center post to center the lid in said basket as said outer cover is closed, and means on said lid operable when the lid is closed to lock the lid to said basket.

2. The extractor set forth in claim 1 including spring means connected to said locking means for biasing the locking means constantly into a locking position, and power operable means for moving said locking means to unlocked position against the force of said spring means, said power operable means comprising an air cylinder operatively interposed between said locking means and said lid for moving the locking means to unlocking position prior to the opening of said cover, and an air line with a swivel coupling at the axis of said lid for supplying air pressure to said air cylinder.

3. The extractor set forth in claim 1, including a drive motor for said basket, an electric switch for controlling said drive motor, and means operatively interposed between said outer cover and said locking means for operating said switch to start said drive motor only when said inner lid is locked to said basket.

4. In an extractor including an upright cylindrical casing having a perforated basket therein open to the top and rotatable on a vertical axis: the combination of an outer cover pivoted to the casing on a horizontal axis at the back side of the extractor for movement of the cover between open and closed positions, an inner lid for said basket loosely carried with said cover as the cover is opened and closed, a center post on said basket extending to the top of the basket and having a peripheral groove near its upper end, said inner lid having a hollow conical centering piece engageable with the upper end portion of said post to center the lid as the outer cover is closed, means on said lid engageable with said peripheral groove to lock the lid in a closed position relative to said basket and out of contact with said outer cover, and power means for controlling said locking means.

5. The extractor set forth in claim 4 including a concentric circular frame member secured to said lid and spaced therefrom at a distance thereabove, and bracket means on opposite sides of said cover having portions underlying said circular frame member at a distance therebelow when both said cover and lid are in respective closed positions, said bracket means providing two lift points for said lid as the cover is swung upwardly from closed position, said lift points being on a line parallel with said horizontal axis and displaced towards said horizontal axis from the vertical axis of said basket whereby to cause the lid to be raised out of closed position without canting.

6. The extractor set forth in claim 4 including a center post on said lid having a sleeve thereon coupled to said locking means to cause the sleeve to be shifted longitudinally as the locking means is moved between locking and unlocking positions, a drive motor for said basket, and switch means operable by said sleeve to prevent operation of said drive motor when said locking means is not engaged to lock said lid to said basket.

7. The extractor set forth in claim 6 wherein said power operable control means comprises an air cylinder with a piston therein operable by compressed air, and an air coupling for said air cylinder leading to an outside source of air pressure including an air duct leading axially through said center post of said lid and an air pipe on said cover having a sealed rotatable coupling with said air duct permitting rotation of said lid relative to said cover.

8. In an extractor including an upright cylindrical casing open to the top and provided at the center thereof with a vertical drive shaft: the combination of a perforated basket mounted on said shaft and having a center post extending to the upper level of the basket and provided with a peripheral groove, a cover for said casing hinged thereto at one side thereof, a lid for said basket adapted to seat therein, said lid having a concentric circular angle bar secured thereto and said cover having two lift members on opposite sides thereof underlying said angle bar at a clearance therebelow when the cover and lid are closed for carrying the lid to open position as the cover is opened, said lid having a central frame structure provided with an upright axially extending post, a pair of dual locking levers pivoted intermediately thereof to said frame structure at opposite sides of said post, respective rollers journaled to lower portions of said dual locking levers for engaging said peripheral groove to lock said lid to said center post as the upper end portions of said locking levers are swung outwardly, spring means connected between said locking levers and said circular angle bar for urging said locking levers into locking positions, air cylinders with piston drive means connected between said upper end portions of said dual locking levers and said circular angle bar for moving said locking levers to unlocked positions, and an air line with a swivel coupling at the top of said center post of said lid for connecting an outside source of air pressure to said air cylinders.

9. The extractor set forth in claim 8 including a slide on the center post of said lid, link members each pivoted at one of their ends to said locking levers and at the other of their ends to said slide whereby the slide is moved upwardly and downwardly respectively as said locking means is moved into locking and unlocking positions, a drive motor for said basket, and a switch for said drive motor mounted on said outer cover, said switch having an operating arm bearing under pressure against the upper end of said slide to cause the switch to be in a motor disabling position when said outer cover is closed and said locking means is in unlocked position.

References Cited

UNITED STATES PATENTS

| 2,907,464 | 10/1959 | Ellis | 210—146 X |
| 3,136,718 | 6/1964 | Miller et al. | 210—146 |
| 3,272,296 | 9/1966 | Fredholm | 210—146 X |

FOREIGN PATENTS

| 223,163 | 2/1962 | Austria. |
| 1,159,355 | 12/1963 | Germany. |
| 428,096 | 5/1935 | Great Britain. |

REUBEN FRIEDMAN, *Primary Examiner.*

D. RIESS, *Assistant Examiner.*